United States Patent [19]

Belofsky

[11] 4,261,390

[45] Apr. 14, 1981

[54] HOSE CONSTRUCTION

[75] Inventor: Harold Belofsky, Ravenna, Ohio

[73] Assignee: Parker-Hannifin Corporation, Cleveland, Ohio

[21] Appl. No.: 18,194

[22] Filed: Mar. 6, 1979

[51] Int. Cl.³ .................................. F16L 11/14
[52] U.S. Cl. ................................. 138/125; 138/126; 138/137; 138/121; 138/153; 138/173
[58] Field of Search ............ 138/118, 103, 124, 125, 138/126, 127, 130, 137, 153, 140, 121, 173, 141, 175

[56] References Cited

U.S. PATENT DOCUMENTS

| | | | |
|---|---|---|---|
| 2,624,366 | 1/1953 | Pugh | 138/137 X |
| 2,690,769 | 10/1954 | Brown | 138/125 |
| 2,988,130 | 6/1961 | Rittenhouse | 138/126 X |
| 3,184,358 | 5/1965 | Utz | 138/125 X |
| 3,282,301 | 11/1966 | Ligon | 138/175 |
| 3,411,981 | 11/1968 | Thomas | 138/141 |
| 3,750,712 | 8/1973 | Brand | 138/126 X |
| 3,825,036 | 7/1974 | Stent | 138/174 |
| 3,944,453 | 3/1976 | Chudgar et al. | 138/132 X |
| 4,147,185 | 4/1979 | Hines | 138/139 |

*Primary Examiner*—James E. Bryant, III
*Attorney, Agent, or Firm*—Joseph B. Balazs

[57] ABSTRACT

A flexible hose construction formed by the non-mandrel extrusion of an inner plastic liner having plural axially extending dovetail shaped projections, extrusion of a rubber support member over the liner in interlocking engagement, winding a yarn reinforcement over the relatively stiff composite core structure, extrusion of a rubber or thermoplastic elastomeric cover thereover and vulcanization of the structure.

9 Claims, 4 Drawing Figures

HOSE CONSTRUCTION

BACKGROUND OF THE INVENTION

This invention relates to reinforced hose having a composite rubber and thermoplastic structure and to the method of making same.

It is conventional in the manufacture of higher quality hose having essentially rubber components to construct same upon either a rigid or flexible mandrel which is used not only as a support for the core, reinforcement and covering layers during application of same but also as a device for providing compressive force to the hose structure during vulcanization and for sizing the interior of the hose. Use of a rigid mandrel limits the length of a single piece of hose and the equipment which must be employed therein is complex and costly. Flexible mandrel-made hose also requires the step of removal of the mandrel from the finished product as well as the additional operations required for reuse of the mandrel materials and difficulty is encountered in retaining flexibility in the larger mandrel sizes.

Vulcanizable or thermosetting rubber hose is desirable in many instances for its favorable qualities of coupling compatibility, flexibility, kink resistance, cost of materials and the like and is superior to presently known all-plastic hoses in many of those aspects and yet still suffers a cost disadvantage due to the additional stages of manufacture, outlined previously. It is desirable to be able to combine the favorable qualities of rubber and plastic materials in a combination hose structure to utilize the advantageous properties of each material and even further advantages from the combination.

Thus, for example, in U.S. Pat. No. 3,988,189 it is described that a hybrid hose having essentially a rubber core tube may be manufactured in either a mandrel or non-mandrel process, the reinforcement and sheathing, which may be plastic, being applied after vulcanization of the core tube.

In the non-mandrel process described, it is suggested that the core tube structure may be developed with the use of a plastic liner, as of nylon or the like, over which synthetic rubber is extruded and then adhered in a subsequent vulcanization operation. The composite, cured, core tube structure may then be passed through further processes to receive bonding agents, reinforcement and sheathing materials.

While a hybrid hose structure is suggested in this reference, little attention is directed to the composite core tube structure other than to mention that adhesion between the layers can be obtained during vulcanization and that the structure is then strong enough to support further reinforcing and sheathing operations.

While it is known, for example, in U.S. Pat. No. 3,825,036 that various combinations of plastics materials may be used to form tubular structures, and that the configuration of the adjacent layers may be selected so as to achieve certain effects, i.e. appreciable bond area or an interlocking effect, or the like, apparently little attention has been directed to the development of composite core tube structures particularly suited for hoses in which reinforcement is to be utilized and in particular for hose structures which utilize a composite rubber and plastic core tube.

SUMMARY OF THE INVENTION

According to the present invention a hose construction that includes a composite core tube structure consisting of an inner plastic liner and an outer rubber support layer, including further reinforcement and covering layers, is made by extruding the inner plastic liner without a mandrel, extruding the rubber support layer thereover, braiding yarn reinforcement thereon, extruding an outer rubber cover thereover and then vulcanizing the structure. The inner plastic liner is extruded with a smooth bore but with a ribbed outer surface which provides an interlocking engagement with the adjacent rubber support layer and cooperates with the latter to provide non-mandrel support for the following reinforcement and cover layers, and a structure favorably suited for support of end fittings.

Preferably, the configuration of the ribbed outer surface of the plastic liner is of a dovetail shape, providing a partly cylindrical outer surface and recessed portions radially inwardly thereof which are filled by the material of the support layer and which provide an interlock therewith.

Such interlocking arrangement of the composite core tube, together with bonding at the reinforcement, provides vacuum capability for the hose structure without the requirement of spiral body wire which is needed in the conventional form of all rubber hydraulic suction hose. The hose of the instant invention is flexible and yet has a high degree of crush and collapse resistance. Bending flexibility is provided by the use of rubber as a substantial component and by the location of the rubber on the outer rather than the inner portions of the hose. The substantially incompressible characteristic of cured rubber is employed in conjunction with the configuration of the relatively more rigid plastic inner liner to provide high resistance to compression.

Further, such composite hose structure allows the use of different liner compounds which may be selected for a wide variety of applications, for example, where high chemical resistance is needed in the inner tube. The manufacturing process is simplified in that the requirement for a mandrel is obviated. And yet a superior hose product is possible. For example, the hose structure disclosed herein resists kinking better than an all-plastic hose and may be considered equal to that of all-rubber hose of the SAE 100R4 type without the need for spiral body wire.

This hose structure is especially advantageous for larger hose sizes, on the order of from $\frac{3}{4}$ inch to 4 inches in internal diameter, although not limited thereto, where mandrel handling is costly and where all thermoplastic constructions are much too stiff.

The bond achieved in this configuration of hose does not require adhesives, does not deteriorate substantially with temperature or age, is compatible with a wide variety of rubber and plastic materials and has a strength which increases with internal pressure.

Figure 1:
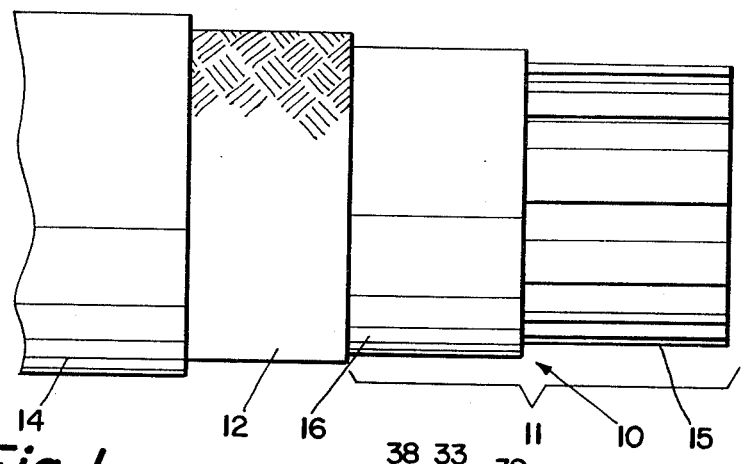
FIG. 1 is a side elevation partly broken away in successive structural layers of a length of an example of the hose of the invention.
Figure 2:
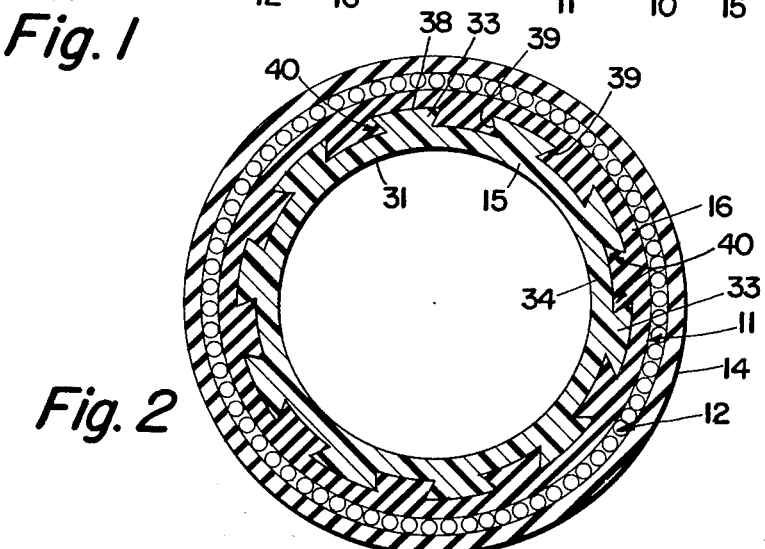
FIG. 2 is an end view of the hose of the invention.

In the example of the hose constructed in accordance with the present invention illustrated in FIGS. 1 and 2 the hose 10 comprises a composite core tube structure 11, a braided layer of polyester yarn reinforcement 12 thereover and an outer cover 14. The composite core tube structure 11 consists of an inner liner 15 and an outer support member 16 thereover, the composite tube structure 11 providing support for the outer reinforcement and cover layers 11 and 14 respectively.

The inner liner 15 of the hose is a flexible thermoplastic material such as a polyamide, polyurethane or polyvinyl chloride or the like may be extruded from DuPont Hytrel polyester compound. The outer support member 16 and the outer cover 14 are neoprene rubber but may be natural or synthetic rubber or any one of the many other forms of elastomeric compounds which provide desired characteristics to the overall hose structure. The reinforcement 12 is one or more layers comprising a yarn made of synthetic or natural filaments and could be wire and may be either braided, knitted or spirally wound over the core tube structure 11.

Figure 3:
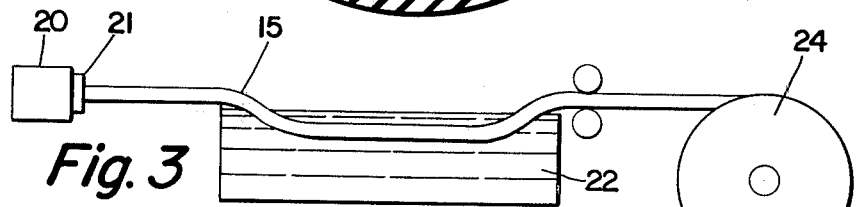
FIGS. 3 and 4 are schematic diagrams illustrating the method of making the hose.
Figure 4:
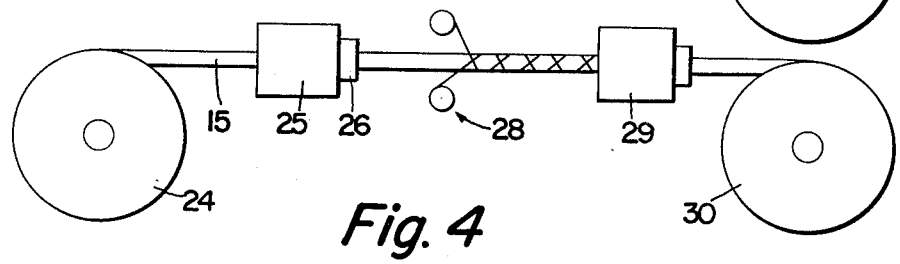

The method of constructing the hose 10 of FIGS. 1 and 2 in accordance with the present invention is illustrated in FIGS. 3 and 4. The inner liner 15 of the selected plastic material is first developed by extrusion in the manner typical for thermoplastic tubing of indeterminate length. The material is extruded from an extruder 20 having an extrusion die 21 of predetermined configuration to provide a desired exterior surface to the inner liner, the liner 15 then passing through a conventional cooling bath 22 and eventually wound on storage reel 24 for further utilization.

The process is continued as seen in FIG. 4 wherein the liner 15 on the storage reel 24 is passed through a further extruder 25 for application of the outer support member 16, the extrusion die 26 at this location providing a relatively smooth outer surface to the support member 16. The reinforcement 12 is applied at the braider stage 28 and the hose structure passed through a further extruder 29 for application of the cover 14 the fully developed hose being wound on storage reel 30. A further stage of the processing for the now fully constructed hose 10 is the transfer of same into a vulcanizer unit for curing of outer support member 16 and cover 14 in any of various suited techniques of vulcanization well understood in the art.

One primary consideration is to avoid overheating and thus softening of the inner thermoplastic liner 15 as this will affect the support provided thereby during the vulcanization stage.

Referring now more particularly to the structure of the composite core tube 11 shown in FIGS. 1 and 2, it is seen that the inner liner 15 is extruded from the initial extruder 20 with a relatively smooth inner surface 31 even though the inner liner 15 is developed in a non-mandrel process, this being a technique of manufacture well known in this art. The outer surface of the inner liner 15 however is formed as a series of radially outwardly projecting ribs 33 which are integral with and extend outwardly of the base section 34, the latter being in the form of a tube in the extended configuration.

The ribs 33 are formed by passing the extrudate through an appropriately shaped extrusion die 21 to provide a plurality of circumferentially spaced axially extending ribs over the outer surface of the inner liner 15. In one embodiment of the invention in, for example, a ¾ inch hydraulic suction line hose, 10 ribs 33 are provided in an equally spaced arrangement about the circumference of the inner member 15.

As seen more clearly in cross section in FIG. 2 each of the ribs 33 is generally of dovetail configuration having a partly cylindrical outer surface 38 and substantially straight sides 39 which flare outwardly from the generally cylindrical outer surface of the inner section 34 to the outer surface 38 to form undercut portions 40.

Again as seen most clearly in FIG. 2 the radial outward extent of the ribs 33 above the inner section 34 is substantially the same as that of the thickness of the inner section 34 while the overall radial dimension of both the rib 33 and inner section 34 is on the order of two thirds of the overall thickness of the composite core tube structure 11 including the support member 16.

Because the maximum thickness of the relatively stiff plastic liner is no more than about 67% of the total thickness of the composite core, and because the dovetail portions 33 of the plastic liner constitute no more than about 50% of the circumferential length of the mid or dovetail portion of the composite core, the hose may be flexed more readily than if either of these percentages were greater.

In the preferred embodiment of the invention described, the circumferential extent of the outer surface 38 of each of the 12 ribs 33 is on the order of 18 degrees, with approximately the same spacing between the ribs 33. The flare of the sides 39 is such as to form an acute angle with the outer surfaces 34, 38 thereby providing undercut portions 40 radially inwardly of the outer surfaces 38 of each of the ribs 33.

It will be apparent that substantial modification may be made in many of the dimensions described to suit particular purposes and that a wide variability of materials may be utilized resulting in change in relative dimensions due to the characteristics of the materials or to results expected. Thus the flare of the sides 39 may be altered to change the size of the undercut portions 40 to achieve greater or lesser interlocking effect while the relative thicknesses of the structure may be changed in consideration for support of the reinforcement or end fitting components. These considerations may likewise affect the number of ribs 33 employed or the extent of the outer surfaces 38, all being considered within the scope of the instant invention.

As the outer support member 16 is extruded in place over the inner liner 15 the then relatively fluid extrudate material will be forced into the undercut portions 40 and by virtue of the sizing of the outside diameter of the extrusion die 26 will provide a circumferentially continuous structure for support of the reinforcement 12 and cover for the hose structure 10.

In filling the space between the dovetail shaped ribs 33 the outer support member 16 becomes mechanically interlocked with the inner liner 15 to prevent collapse or radial inward movement of the inner line 15 with respect to the outer member 16 even though no adhesive bond is used at the interface. This dovetail configuration of the composite core structure 11 also provides a high degree of resistance to kinking of the hose structure or even a transverse crushing of same due to the action of the material of the outer support member 16 trapped in and between the undercut portions 40 of adjacent ribs 33. Thus in either a flexing or a crushing action portions of adjacent ribs 33 will tend to be moved toward one another thereby tending to compress the material of the outer support member therebetween. Due to the relatively incompressible nature of cured rubber such action will be resisted resulting in a hose structure which compares very favorably with state-of-the-art hose structures wherein spiral body wires are necessary.

It will also be noted that the cylindrical outer surface 38 of the ribs 33 and the inner section 34, in conjunction with the support member 16, provide a relatively stable structure both in the areas over the outer surfaces 38 and those areas between adjacent ribs 33 to provide a relatively consistent support or core structure 11 for the reinforcement 12 which will be wound thereover. Thus a wide choice of materials is available for the type of reinforcement 12 which may be laid over the composite core structure 11 as well as allowing latitude in the degree of force or pressure that may be associated with such structural windings.

The reinforcement 12 laid over the composite core tube structure 11 may comprise a single layer of yarn braided over the relatively stiff core tube structure. In the ¾ inch hose embodiment described one braid of PET yarn is sufficient to meet SAE 100R4 performance specifications. However any number of layers of material may comprise the reinforcement 13 of the hose structure 10 in either open or closed weaves being yarn or wire, for example, and being wound, knitted or braided in place.

The final extrusion stage provided by extruder 29 is the development of an outer cover 14 which is preferably a neoprene rubber cover laid in engagement with the reinforcement 12 and having a relatively smooth outer surface. The complete hose structure 10 is then cured, for example, in boiling water or steam by well known vulcanization techniques, it being understood that the inner liner 15 provides adequate support during this stage of the process and that the vulcanization can be effected without solid mandrel support. As is well understood in the art, vulcanization of the hose provides a change in the characteristics of the rubber comprising the outer cover 14 and the outer support member 16 and effects a bond of each with the adjacent reinforcement layer 12 therebetween. No additional agents need to be applied to the structures to achieve the desired bonding effect at such locations, although bonding agents could be applied to achieve their effects, if desired.

I claim:

1. A flexible hose construction comprising an inner thermoplastic tubular member having a base section with circumferentially spaced axially extending radially outwardly protruding ribs thereon, a support member disposed over said inner tubular member, said support member being of generally tubular configuration and having radially inwardly directed portions thereon protruding between the ribs of said inner member, a reinforcement wound over said support member and an outer cover over said reinforcement said ribs on said inner tubular member being generally of dovetail configuration in cross section having substantially straight sides forming undercut portions into which said radially inwardly directed portions of said support member protrude, substantially completely filling said undercut portions to provide a radial interlocking engagement, said ribs having a curved partly cylindrical outer surface.

2. The hose of claim 1 wherein said ribs on said inner tubular member have undercut portions and the radially inwardly directed portions of said support member substantially completely fill said undercut portions to provide an interlocking engagement therebetween.

3. The hose of claim 2 wherein said ribs on said inner tubular member are generally of dovetail configuration in cross section having substantially straight sides at said undercut portions and a curved partly cylindrical outer surface.

4. The hose of claim 1 wherein the radial thickness of said inner member at said ribs is less than about twice the thickness of said inner member at said base section between said ribs and less than about two-thirds the combined radial thickness of said inner member and said support member.

5. The hose of claim 4 wherein said inner member is a thermoplastic material and said support member and said outer cover are rubber.

6. The hose of claim 5 wherein said reinforcement is braided yarn and is bonded by vulcanization to said support member and said outer cover.

7. The hose of claim 6 wherein said inner plastic member is Hytrel and said support member and outer cover are neoprene.

8. A flexible tubular composite structure for transporting fluids and accommodating end fittings, comprising an inner flexible tubular member having a smooth bore in engagement with a more flexible outer tubular member having a substantially smooth cylindrical outer surface, radial inwardly and outwardly extending projections integral with said outer and inner members, respectively, and in interlocking engagement with one another, said projections being substantially equally circumferentially spaced, and extending the full length of said tubular members; said radial outwardly extending projections having curved outer surfaces forming part of a generally cylindrical surface suited for support of end fittings, the radial thickness of said outer member over said curved outer surfaces being at least as great as one-third the radial thickness of said composite structure.

9. The tubular structure set forth in claim 8 wherein said inner member is plastic, said outer member is rubber and said curved outer surfaces together comprise, in circumferential extent, approximately one-half of a full cylindrical surface for support of end fittings.

* * * * *